2,810,681

CHEMICAL PROCESS

Martin L. Nadler, Wilmington, Del., assignor to E. I. du Pont de Nemours & Company, Wilmington, Del., a corporation of Delaware No Drawing. Application August 17, 1956, Serial No. 604,613

2 Claims. (Cl. 202—57)

This invention relates to a chemical process, and more particularly to an improved process for recovering toluene-2,4-diisocyanate (hereinafter referred to as TDI) from the crude reaction mixture in which it is formed and from the tarry materials normally resulting from the distillation of such crude diisocyanate.

In the preparation of organic isocyanates, such as toluene-2,4-diisocyanate by phosgenation of the corresponding diamine in an inert solvent such as ortho-dichlorobenzene, minor amounts of complex higher-boiling side-products are also generally formed. These materials accumulate as a distillation heel (residue or tar) when the solvent and then the isocyanate is distilled. While most of the isocyanate can be removed from the reaction mass by ordinary distillation, an appreciable quantity remains in the concentrated viscous tar, from which complete removal by simple distillation techniques is difficult. Failure to recover this quantity of valuable product represents a significant economic loss.

In co-pending application of Griffin, Railing and Yacoe, Serial No. 585,482, filed May 17, 1956, by the assignee of the present application, a process for recovering toluene-2,4-diisocyanate by passing the crude materials at a temperature above the boiling point of the TDI into a high boiling naphthenic hydrocarbon oil is described, in which the residual non-volatile tar residues are insoluble. It has been found, however, in this process, that during the distillation of the TDI, due to the splattering of the oil containing the insoluble tar residues on the sides of the distillation vessel, this non-volatile tarry residue adheres to the sides of the vessel above the liquid level and builds up to objectionable amounts. The build-up of these tarry residues on the walls of the distillation vessel lessens the rate of heat transfer through the walls and ultimately decreases the vapor space above the oil level to a point where the apparatus must be shut down and cleaned. Because of the relatively high temperatures employed, the accumulated residue on the upper walls of the vessel and on the agitator shaft becomes baked into a hard, rock-like mass so that removal requires tedious and time-consuming manual labor.

It is therefore an object of the present invention to provide an improved process for the distillation of toluene-2,4-diisocyanate from the reaction mass in which it is formed, in which the crudes are passed into a high boiling non-volatile naphthenic hydrocarbon oil at temperatures above the boiling point of the TDI, wherein a sludge dispersant is employed to prevent the build-up of tar residues in the distillation vessel, particularly above the level of the liquid from which the TDI is being distilled. It is a further object of the invention to add to the naphthenic hydrocarbon oil a surface-active agent whereby the particle size of the non-volatile tar material as it collects in the naphthenic hydrocarbon oil may be controlled to permit ready filtration and handling through pumps and lines in the system.

According to the present invention, the toluene-2,4-diisocyanate may be recovered directly from the phosgenation mass in which it is formed by first flashing off the phosgene and hydrogen chloride and then introducing the solvent solution of the crude TDI containing non-volatile tarry materials into a hot naphthenic hydrocarbon oil which does not distill at 300° C. under 10 millimeters absolute pressure. The non-volatile tarry residue from which the volatile TDI is vaporized is converted into granular residues which are suspended in the high boiling oil. These residues are readily removed from the oil by ordinary filtration, so that the oil can again be used in the process. The present invention comprises the addition to the high boiling naphthenic hydrocarbon oil of a surface-active agent, often referred to as a "surfactant," of the type more particularly described for use in lubricating oils in U. S. Patents 2,666,044 and 2,737,496 and for fuel oils in U. S. Patent 2,737,452. These sludge inhibiting or sludge dispersing agents may be generally referred to as basic nitrogen-containing polymers, the components of which are ethylenically unsaturated compounds, one of which is amine-free and contains from 8 to 18 carbon atoms in the aliphatic hydrocarbon chain and one of the components as it exists in the copolymer contains a basic amino-nitrogen in the side chain, said polymer containing from 0.1% to 3.0% by weight of basic amino-nitrogen and having an inherent viscosity of 0.1 to 3.0 as determined at 0.1% weight/volume concentration in benzene at 25° C. These polymers may be copolymers containing even more than two copolymerizable components, as clearly pointed out in the patents above-mentioned. Any of the basic nitrogen-containing polymers described in the three patents above identified may be employed in the present invention.

The naphthenic hydrocarbon oil is preferably maintained at a temperature of from 200° to 315° C. and under a pressure of from 1 mm. to 80 mm. absolute. In all cases of course the oil is maintained at a temperature below its boiling or distillation point but above the boiling temperature of the TDI and the volatile constituents of the TDI reaction mass.

The sludge dispersant added to the naphthenic hydrocarbon oil should be in an amount equal to about 0.05% to 3.0%, based on the weight of the oil.

The media in which the process of the present invention is carried out is a naphthenic hydrocarbon oil of the nature of a lubricating oil bright stock. These refined oils consist essentially of carbocyclic ring structures having paraffinic side chains. The majority of the carbocyclic rings are saturated, but a small portion may be aromatic in nature, depending on the source of the parent crude oil. The percent of aromatic rings present in the molecule may range up to about 10% of the total hydrocarbon composition. These refined oils do not boil at 300° C. at 6 mm. absolute pressure. A typical example of this bright stock suitable for use in the process of the present invention can be characterized by Saybolt Universal viscosity of 185 to 220 seconds at 210° F. and specific gravity of 0.907 at 15.56° C. Another typical stock employed has a Saybolt Universal viscosity of from 150 to 155 seconds at 210° F. and a specific gravity of 0.902 at 15.56° C.

Because of the low volatility of these oils they should not distill with the isocyanate at the temperature employed. When a small quantity of the oil is entrained by the distilling vapors of the isocyanate, a simple distillation is sufficient to completely separate the isocyanate from the oil and the oil residue can be returned to the flash distillation kettle. These oils, which will be referred to in the present application as "naphthenic hydrocarbon oils," have good thermal stability under the conditions employed in the present process, since they do not crack or form unsaturated compounds during the heating, and, since they are free from olefinic unsaturated hydrocarbons, they are not prone to undergo oxidative degradations and polymerizations which would ultimately reduce the life of the oil and also reduce the yield of the isocyanate that could be obtained.

As pointed out in co-pending application Serial No. 585,482, the naphthenic hydrocarbon oils above described give results in this process which are not obtained by the use of high boiling saturated hydrocarbons of the paraffinic type, or other organic solvents which have a higher solvent power for the tar residues.

Ordinarily an amount of naphthenic hydrocarbon oil will be employed equal to at least one part of oil to one part of tar residue which is found to exist in the crude TDI solution where the distillation is being carried out as a batch operation. Usually higher ratios of oil to tar will be employed, such as 2:1 to 4:1 ratios, particularly where the process is being carried out as a continuous process.

The sludge dispersant, or surfactants, are preferably addition type copolymers containing in combined form as their essential monomeric components, copolymerizable ethylenically unsaturated compounds which contain only one polymerizable ethylenic linkage, at least one of which components is amine-free and contains from 8 to 18 carbon atoms in an aliphatic hydrocarbon chain, which in the polymer is not part of the main chain, and one of the components as it exists in the polymer containing a basic amino-nitrogen in the side chain, the said copolymer containing 0.1% to 3.0% by weight of basic amino-nitrogen.

The type of amine-free components employed in the preparation of these copolymers includes the long chain alkyl methacrylates such as lauryl methacrylate, tridecyl methacrylate, octadecyl methacrylate, n-octyl methacrylate, 2-hexylethyl methacrylate, sec.-capryl methacrylate, n-decyl acrylate, and such compounds as vinyl laurate, ar-dodecyl styrene, laurylethyl maleate, lauryl fumarate, dodecylhexyl styrene, of the types more particularly described in U. S. Patents 2,666,044, 2,737,496 and 2,737,452.

The second component of the copolymer which contains the basic nitrogen in the side chain may be exemplified as such compounds as beta-diethylaminoethyl methacrylate, paradiethylaminoethyl styrene, 2-methyl-5-vinyl pyridine, 4-vinyl-pyridine, 4-dimethylaminocyclohexyl methacrylate, beta-dicyclohexylaminoethyl methacrylate, diallylamine, and any other basic amino-nitrogen compound including primary, secondary and tertiary amines as more particularly exemplified in the patents above mentioned. As illustrated in these patents, the basic amino-nitrogen containing component that imparts sludge-inhibiting and dispersing properties to the polymers useful in this invention can be introduced through the use of appropriate copolymerizable monomers containing primary, secondary and tertiary amino nitrogen that is attached ultimately to the chain of the polymer as part of an extralinear substituent group in which the nitrogen is joined extranuclearly only to non-benzenoid carbon atoms. Attachment of the amino groups to the main copolymer carbon chain can be through strictly hydrocarbon structures or through ether, ester, or amide linkages.

As disclosed in the patents above mentioned which more particularly describe the sludge dispersants employed in the present invention, the amount of first and second component employed will of course be that required to give in the final polymer a basic nitrogen content of 0.1% to 3.0% of the total weight of the polymer. Usually from 75% to 95% of the long chain methacrylates with from 5% to 25% of the basic nitrogen-containing monomer will give the desired products.

These sludge dispersants may also contain additional copolymerizable components which may be added to the polymer to maintain the basic nitrogen content within the range specified above, as more particularly illustrated in U. S. Patents 2,666,044 and 2,737,496.

The presence of these sludge dispersants in the hot oil from which the TDI is to be distilled greatly inhibits the accumulation of tar on the walls of the distillation apparatus particularly above the level of the oil. It also markedly alters the physical character of the tar residues in the oil, where in the absence of these dispersants insoluble tar residue may accumulate in the oil in the form of large aggregates, which makes the circulation of the oil containing these residues through pumps and filters difficult. The addition of the sludge dispersant to these oils causes the tar residue to be dispersed in the oil in a more readily filterable form which appears to be more powdery than granular, so that the oil containing these insoluble residues is more fluid and therefore more easily pumped from the reactor to filter or centrifuge.

In the presence of the sludge dispersant, where residues build up on the walls of the still these residues remain in a soft and easily removable form.

For efficient operation of the process, the concentration of the tar residue in the oil in the still should not exceed 25% of the weight of the oil. In a continuous system, the concentration of the tar residue in the oil is preferably held at from 5% to 10%.

In general, the operation of the process in which a sludge dispersant is employed in the naphthenic hydrocarbon oil is the same as that described in application Serial No. 585,482 where no sludge dispersant is employed, and the apparatus used for continuous operation or for batch process may be the same as described in that patent application.

The following examples are given to illustrate the invention, it being understood that the invention is not limited to the specific procedure disclosed and is to be limited only by the scope of the attached claims.

Example 1

600 parts of a naphthenic hydrocarbon oil having a Saybolt Universal viscosity of 150 seconds at 210° F., are placed in a vessel equipped with an agitator and a condenser leading to a receiver. To this oil is added 18 parts of a 90:10 copolymer of technical lauryl methacrylate and beta-diethylaminoethyl methacrylate. The system is evacuated to an absolute pressure of 20 mm. of mercury, and the stirred oil mixture is heated to 220° C. To this oil mixture is fed over a period of 1.5 to 2 hours, 482 parts of a residue from the distillation of a mixture of toluene-2,4- and toluene-2,6-diisocyanates, analyzing as 35.3% toluene diisocyanate and containing 80% of the 2,4-isomer and 20% of the 2,6-isomer. The distillate collected in the receiver weighs 123 parts and is 96.8% toluene diisocyanate as determined by analysis. The recovery of the diisocyanate is 69.4% of that present in the original tarry residue.

The non-volatile residue which remains behind suspended in the oil is a uniformly divided solid, readily filterable from the oil. A small amount of residue build-up is found on the agitator shaft and side walls of the reactor; it is paste-like in character and is easily removed by scraping.

When this experiment is repeated except that no polymeric dispersant is added to the naphthenic oil, the recovery of the toluene diisocyanate from the distillation residue is substantially the same as above, and the resulting granular solid found suspended in the oil is readily filtered from the oil. However, on the agitator shaft and on the walls of the reactor there is a heavy, crusty, rock-like residue which is difficult to remove.

Substantially the same results are obtained on substituting a toluene-2,4-diisocyanate distillation heel for the 80:20 2,4- and 2,6-toluene diisocyanate distillation heel described above.

Where 0.3 part of the same sludge dispersant is used, a recovery of 75.2% of the diisocyanate is obtained and the residue is suspended as uniformly dispersed solid that is separable from the oil by filtration. The small deposit on the walls of the reactor and agitator shaft is readily removed.

*Example 2*

The procedure of Example 1 is repeated, using the following materials:

600 parts of the naphthenic oil of Example 1
3 parts of a 75:25 copolymer of technical lauryl methacrylate and beta-diethylaminoethyl methacrylate
343 parts of the distillation heel of an 80:20 mixture of 2,4- and 2,6-toluene diisocyanates analyzing as 47.3% toluene diisocyanate The distillate collected in the receiver, weighing 126.6 parts and analyzing as 98.5% toluene diisocyanate, corresponds to a recovery of 76.8% of the toluene diisocyanate which was orginally present in the distillation heel.

As in Example 1, the residue which is found suspended in the oil is readily separated from the oil, e. g., by filtering or centrifuging. In contrast to the runs in which no oil additive was present, there is a small amount of an easily removed deposit on the walls of the reactor and on the agitator shaft.

*Example 3*

Example 1 is repeated, except that the following materials and quantities are used:

600 parts of the naphthenic hydrocarbon oil of Example 1
3 parts of an 80:20 copolymer of isooctyl methacrylate and beta-diethylaminoethyl methacrylate
371 parts of the distillation heel of Example 2

The recovery of toluene diisocyanate (133 parts, analyzing 97.8%) is 74.1% of that present in the original tar. The character of the residue suspended in the oil and that adhering to the equipment is essentially that described in the previous examples.

*Example 4*

Example 3 is repeated, except that (a) the oil additive is a 95:5 copolymer of technical lauryl methacrylate and vinyl pyridine (3 parts, corresponding to 0.5% by weight, based on the oil), and (b) the toluene diisocyanate distillation heel weighs 353 parts.

The recovery is 77.8% (132 parts, analyzing 98.8%) of toluene diisocyanate. The character of the residue suspended in the oil and the residue adhering to the equipment are essentially that described in the previous examples.

*Example 5*

600 parts of a high boiling naphthenic hydrocarbon oil having a Saybolt Universal viscosity of 150 seconds at 210° F., are placed in a vessel equipped with an agitator, a packed distillation column and a condenser leading to a receiver. To this oil is added 0.3 part of a 90:10 copolymer of technical lauryl methacrylate and beta-diethylaminoethyl methacrylate. The pressure on the system is reduced to 20 mm. of mercury and the oil is heated to 235° C. while agitating. There is then gradually added to the agitated oil, 378 parts of crude toluene-2,4-diisocyanate analyzing 89.6% toluene-2,4-diisocyanate. This has been prepared by phosgenating toluene-2,4-diamine in o-dichlorobenzene and then stripping off the solvent. This addition is made at a uniform rate over a period of 85 minutes. The toluene-2,4-diisocyanate distills through the column and collects in the receiver. The residue which remains in the oil is a uniformly divided solid that is readily separated from the oil by filtration. The residue which adheres to the walls of the reactor and to the agitator shaft is soft and easily removed, in contrast to the difficulty removable crusty solid which sticks to the equipment in the absence of the oil additive. The recovery of toluene-2,4-diisocyanate in the above example is roughly 320 parts, analyzing 98% toluene diisocyanate.

Substantially identical results are obtained when this example is repeated except that (a) the feed stock, which is fed over 63 minutes, is 481.3 parts of solvent-topped crude toluene diisocyanate containing 86% of the 2,4-isomer and 14% of the 2,6-isomer and analyzing as 66.7% toluene diisocyanate, and (b) the temperature is 220° C. and the pressure on the system 20 mm. of mercury. 305.7 parts of distillate are collected, analyzing 98.6% toluene diisocyanate. The recovery is 94.2% of that present in the original crude toluene diisocyanate.

It is of course understood that the process of the present invention as more particularly illustrated in the above examples may be carried out in a continuous manner by the process and using the apparatus more specifically disclosed in co-pending application Serial No. 585,482, since the addition of the sludge dispersant in the present invention in no manner alters the process of carrying out the reaction either in a batch or in a continuous manner.

In this specification, the expression "crude toluene diisocyanate" is used to designate the product resulting from the phosgenation of the aromatic amine after the excess phosgene and hydrogen chloride have been flashed or otherwise removed from the crude diisocyanate. Where a solvent has been used in the phosgenation, the crude toluene diisocyanate will contain the solvent as well as the tarry materials from which the diisocyanate must be separated. It is often desirable to distill the crude toluene diisocyanate to take off the volatile solvent and a substantial portion of the pure toluene diisocyanate, leaving a crude which contains 75% or less of isocyanate. Usually, it is impractical to reduce the concentration of the isocyanate in the tar containing crude below 40%, since the residue becomes viscous and difficult to handle. Crudes containing as low as 40% of toluene diisocyanate can be distilled by the process of this invention.

The process of the present invention is particularly suitable for the distillation of toluene-2,4-diisocyanate and the normally occurring mixture of the toluene-2,4-diisocyanate and the toluene-2,6-diisocyanate.

The long chain alkyl methacrylates used in the preparation of the oil dispersants of the present invention may of course be produced from the technical grade long chain alcohols. The technical lauryl methacrylate referred to in the above examples is a methacrylic acid ester of technical lauryl alcohol which is obtained by reduction of the fatty acids of cocoanut oil and is therefore a mixture of straight chain alcohols containing from 8 to 18 carbon atoms. A typical example of this particular alcohol will contain approximately 3% of $C_{10}$, 61% of $C_{12}$, 23% of $C_{14}$, 11% of $C_{16}$ and 2% of $C_{18}$ alcohols.

In recovering the toluene diisocyanate according to the process of the present invention, it is usually not necessary to employ pressures lower than 5 mm. mercury or to exceed 250° C. The preferred temperatures are from 200° to 250° C. at pressures ranging from 5 mm. to 20 mm. mercury.

I claim:

1. In the process for recovering toluene diisocyanate from crude reaction mixtures containing tarry materials in which the crude is passed into a non-volatile naphthenic hydrocarbon oil which is held at temperatures of from 200° to 315° C. at pressures of from 1 to 80 mm. mercury, the improvement which comprises having incorporated in the naphthenic hydrocarbon oil from 0.05% to 3.0%, based on the weight of the oil, of an oil-soluble basic amino nitrogen containing addition type copolymer containing in combined form as its essential monomeric components copolymerizable ethylenically unsaturated compounds each containing only one polymerizable ethylenic linkage, at least one of which components is amine-free and contains from 8 to 18 carbon atoms in an aliphatic hydrocarbon chain which in the copolymer is not part of the main chain, and one of the components as it exists in the copolymer containing a basic amino nitrogen in the side chain, said copolymer containing 0.1% to 3.0% by weight of basic amino nitrogen.

2. In the process for recovering toluene diisocyanate from crude reaction mixtures containing tarry materials in which the crude is passed into a non-volatile naphthenic hydrocarbon oil which is held at temperatures of from 200° to 315° C. at pressures of from 1 to 80 mm. mercury, the improvement which comprises having incorporated in the naphthenic hydrocarbon oil from 0.05% to 3.0%, based on the weight of the oil, of an oil-soluble basic amino nitrogen containing addition type copolymer containing in combined form as its essential monomeric components copolymerizable ethylenically unsaturated compounds one of which is lauryl methacrylate and one of which is beta-diethylaminoethyl methacrylate, said copolymer containing 0.1% to 3.0% by weight of basic amino nitrogen.

No references cited.